United States Patent
Kanao

[11] Patent Number: 5,458,380
[45] Date of Patent: Oct. 17, 1995

[54] PIPE JOINT

[76] Inventor: Shiro Kanao, 9-18, Nanpeidai 4-chome, Takatsuki-shi, Osaka, Japan

[21] Appl. No.: 265,335

[22] Filed: Jun. 24, 1994

[30] Foreign Application Priority Data

Jun. 25, 1993 [JP] Japan ................. 5-039732 U

[51] Int. Cl.$^6$ ........................................ F16L 71/06
[52] U.S. Cl. .................. 285/369; 285/419; 285/424; 285/903; 285/373; 24/281
[58] Field of Search ........................ 24/280, 281, 282; 285/373, 903, 419, 424, 369

[56] References Cited

U.S. PATENT DOCUMENTS

| | | | |
|---|---|---|---|
| 1,295,776 | 2/1919 | McClelland | 285/419 |
| 1,358,550 | 11/1920 | Holub | 285/424 |
| 1,661,674 | 3/1928 | Osborn | 285/424 |
| 2,737,402 | 3/1956 | De Frumerie et al. | 285/419 |
| 2,754,406 | 7/1956 | Browne | 24/281 |
| 3,189,970 | 6/1965 | Barr | 285/373 |
| 3,298,721 | 1/1967 | Wiley | 285/419 |
| 4,557,510 | 12/1985 | Overmyer | 285/419 |
| 4,583,770 | 4/1986 | Kreku et al. | 285/373 |
| 4,784,202 | 11/1988 | White | 285/419 |
| 4,903,996 | 2/1990 | Herr | 285/419 |

FOREIGN PATENT DOCUMENTS

| | | | |
|---|---|---|---|
| 769622 | 10/1967 | Canada | 285/419 |
| 444596 | 2/1968 | Switzerland | 285/373 |

Primary Examiner—Eric K. Nicholson
Attorney, Agent, or Firm—Sughrue, Mion, Zinn, Macpeak & Seas

[57] ABSTRACT

A pipe joint incldues joint main body having securing through holes respectively formed at positions spaced apart from the two ends of the joint main body by a given distance in the longitudinal direction thereof for securing hook portions, and a plurality of flange bodies each including hook portions respectively formed on one end side thereof to be inserted and secured to the respective securing holes and a flange portion formed on the other end side thereof and having a connecting hole.

5 Claims, 7 Drawing Sheets

PIPE JOINT

BACKGROUND OF THE INVENTION

The present invention relates to a pipe joint which is used to connect the respective end portions of two pipes with each other.

Conventionally, as a pipe joint of the above type, there are known various pipe joints. Also, generally, there are used many pipe joints each having a two-division structure in which a short cylinder having an inside diameter slightly larger than the outside diameter of pipes to be connected is divided into two parts in the axial direction thereof. For example, there is often used a pipe joint having such a two-division structure as shown in FIGS. 13 and 14. The pipe joint (J) of this structure consists of two metal members each of which includes a joint main body 01 formed of a thick metal plate in a semi-circular shape, two thick metal flat plates 02, 02 respectively welded to the two end portions of the joint main body 01 in such a manner that they project outwardly, and connecting holes 03 respectively formed in the two thick metal plates 02, 02. In the pipe joint (J), removal preventing projections 04 are welded to the inner surface of the joint main body 01. In operation, the respective end portions of two pipes (H), (H) to be connected are butted against each other, the two metal member main bodies 01, 01 are butted against each other after the two outer peripheral portions of the two pipes are wrapped with a sheet packing 07, and, as shown by virtual lines in FIG. 13, the two opposing metal flat plates 02, 02 are tightened by bolts 05 and nuts 06 through the connecting holes 03.

However, the conventional pipe joint (J) has several problems to be solved. First, since the inside diameter of the joint main body 01 must be matched to various kinds of the diameters (in particular, the outside diameters) of the pipes (H) to be connected, it is necessary to prepare various kinds of pipe joints. Second, because the metal flat plates 02, 02 must be connected to the two end portions of the joint main body 01 by use of welding means, it takes time and labor to manufacture the pipe joint (J). Third, as the joint main body 01 and metal flat plates 02 must be welded to each other in such a manner that they intersect each other accurately perpendicularly, skill is required. Fourth, since these two members are connected together by use of the welding means, it is necessary to use a thick metal plate having such a thickness that can prevent occurrence of welding distortion in the material of the joint main body 01, with the result that the whole pipe joint (J) is heavy in weight.

SUMMARY OF THE INVENTION

The present invention was made to solve the problems found in the conventional pipe joint. Accordingly, it is an object of the invention to provide a pipe joint which is not limited to a two-division structure but can be formed as an integral body, allows simplified production and mass production by producing a joint main body and a flange body separately from each other, and can adapt one kind of flange body to various kinds of pipes having different diameters.

In attaining the above object, according to the invention, there is provided a pipe joint which comprises a joint main body including securing through holes for securing hook portions (which will be described later), the securing holes respectively formed at positions spaced apart from the two ends of the joint main body by a given distance in the longitudinal direction thereof, and two or more flange bodies each including in one end portion thereof hook portions respectively to be inserted into and secured to the securing holes and in the other end portion thereof a flange portion having a connecting hole.

In other words, according to the structure of the pipe joint of the invention, the joint main body having a length corresponding to the diameters of pipes to be connected can be produced separately from the flange bodies each serving as a metal member for tightening the joint main body. In use, the joint main body and flange bodies are secured and connected to each other in a one-touch manner so that they can be used as an integral structure.

That is, in operation, the end portions of pipes to be connected are butted against each other, a sheet packing is wound round the outer periphery of the butting area as needed, the joint main body is put on them, the hook portions of the flange bodies are respectively inserted into and secured to the securing holes of the joint main body so that the flange portions of the flange bodies are opposed to each other, and a bolt is inserted into the connecting holes of the flange portions and is tightened with a nut, thereby fixing the two pipes. In this manner, by means of tightening of the bolt and nut, the end portions of the two pipes to be connected can be strongly connected to each other and can be sealed simultaneously. Incidentally, as seal means for making watertight or airtight between the butted portions of the two pipes, there can be used well-known means, for example, a seal tape is wound around the outer peripheries of the butted portions to thereby attach them together in a watertight or airtight manner.

As described above, according to the pipe joint of the invention, since the joint main body forming a main part of the joint and the flange body for tightening are structured separately from each other, advantageously, they can be produced independently of each other, the flange body of the same size can be mass produced regardless of the sizes of the diameters of the pipes to be connected, and the flange body of the same size can be used in common for the joint main bodies having different sizes. Also, due to the fact that the joint main body has a simplified structure in which only the securing holes are formed in the neighborhood of the two ends thereof, only by setting the distance between these securing holes properly, simultaneously when the main portion of the joint main body is formed by stamping or by cutting, the securing holes can be formed by stamping, so that the joint main bodies of various sizes corresponding to various pipe diameters can be produced easily. Further, since the joint main body requires no direct welding or the like, it is possible to use a thin metal plate having a thickness that can prevent the securing hole from tearing, which makes it easier to produce the joint main body. In addition, if a plurality of securing holes are formed in one end portion or in the two end portions of the joint main body such that they are respectively shifted in position in the longitudinal direction of the joint main body, then it is also possible to use one joint main body for two or more kinds of pipes to be connected respectively having different pipe diameters by securing the hook portions of the flange bodies to the selected ones of the securing holes.

The joint main body and flange body of the pipe joint according to the invention may be formed of synthetic resin, FRP or the like and, preferably, they may be formed of a rigid material such as a steel plate, a stainless steel plate, an iron plate or the like. Also, the steel plate and iron plate may be preferably subjected to an anti-corrosion treatment such as zinc plating, tin plating, painting, resin coating or the like. The joint main body may be formed in a flat plate shape, or in a semi-circular shape previously adjusted to the diameters of the pipes to be connected. The flange body may also be formed in a flat plate and, preferably, it may be previously formed in a bent shape or in a semi-circular shape because the bent or semi-circular shape is more suitable for actual use.

DETAILED DESCRIPTION OF THE PREFERRED EMBODIMENTS

The preferred embodiments of the present invention will now be described with reference to the accompanying drawings.

Figure 1:
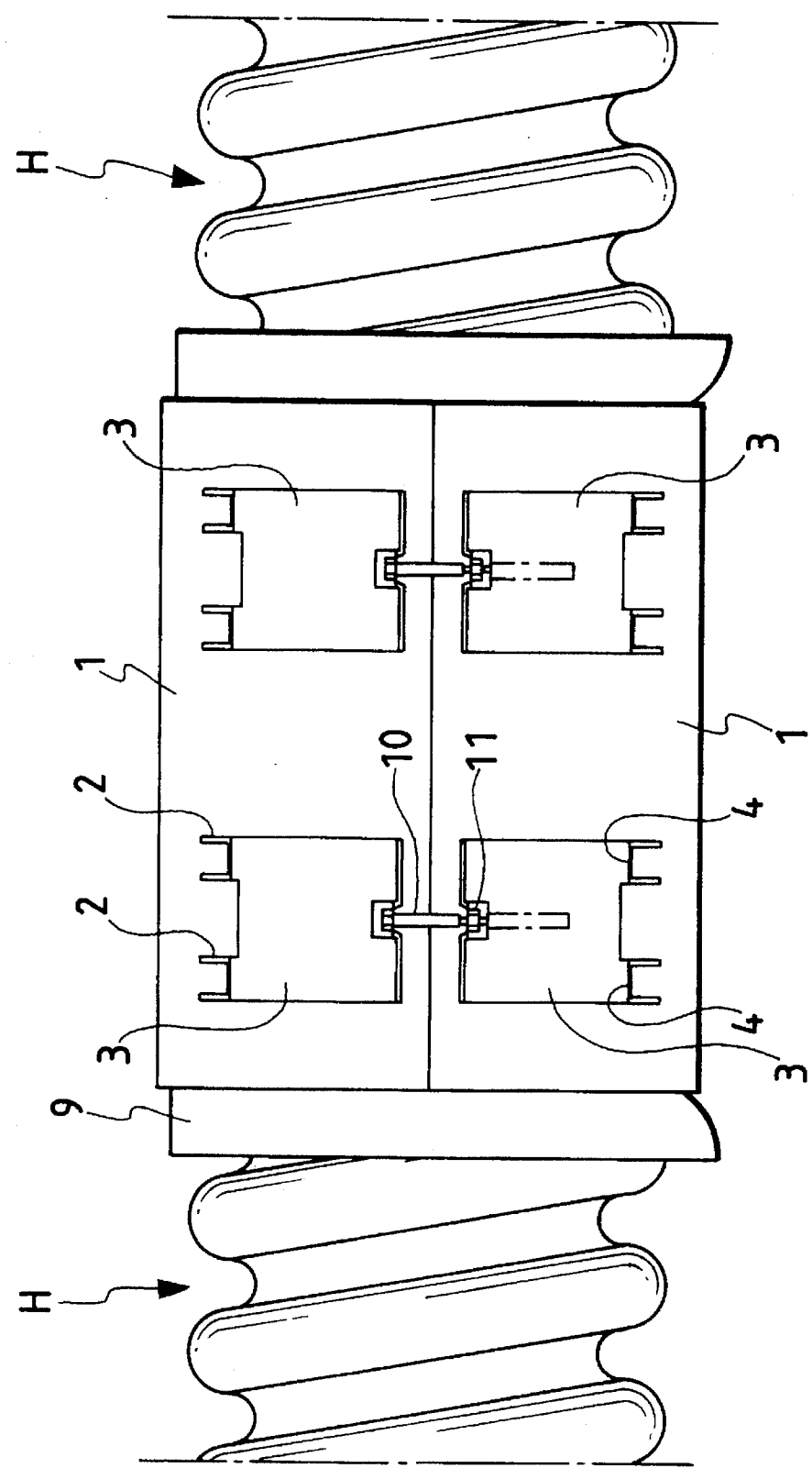
FIG. 1 is a front view of a pipe joint according to a first embodiment of the present invention, showing the condition of the pipe joint when in use.
Figure 2:
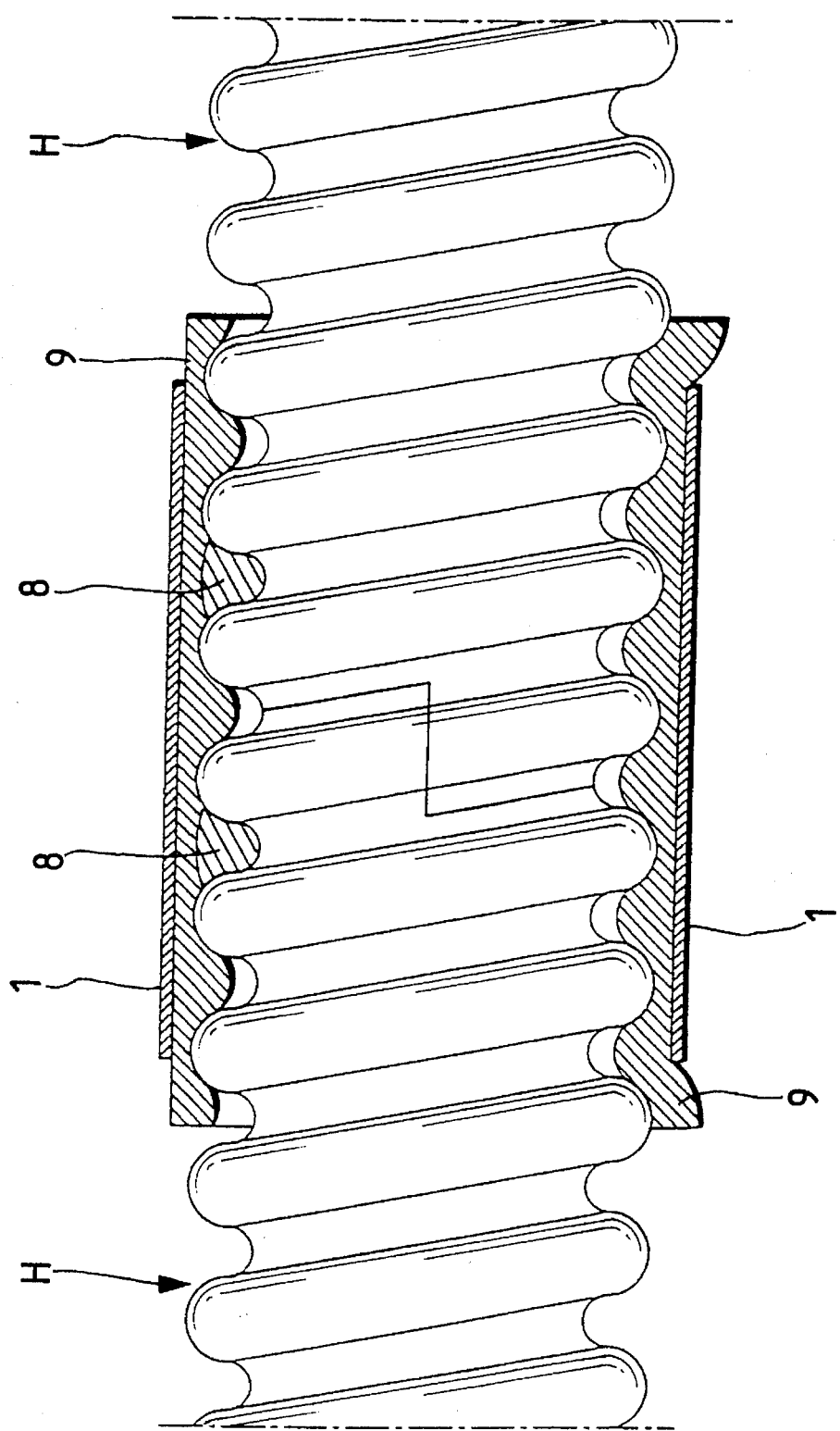
FIG. 2 is a longitudinal section view of the pipe joint of FIG. 1.
Figure 3:
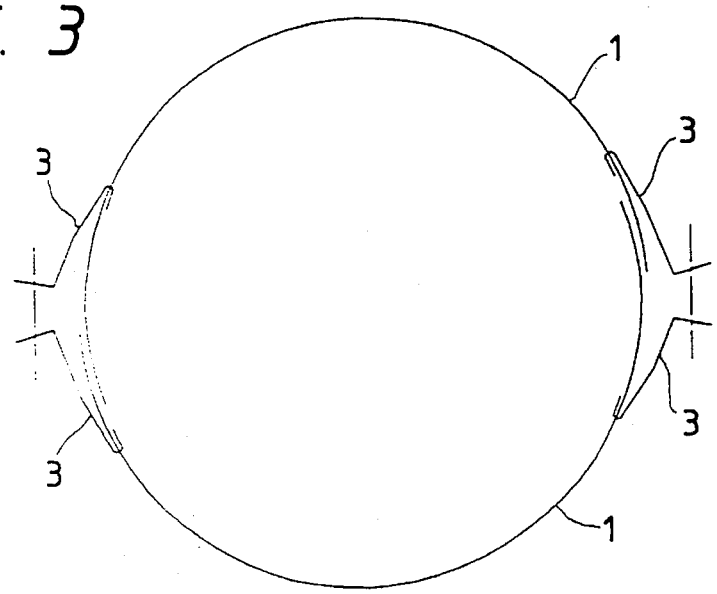
FIG. 3 is a schematic view of the pipe joint of FIG. 1, showing the side surface shape thereof when in use.
Figure 4:
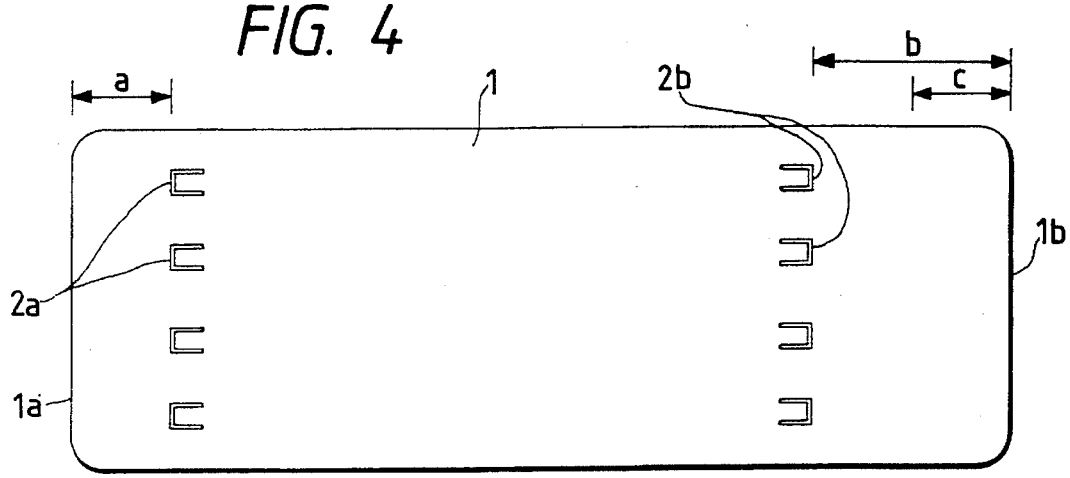
FIG. 4 is a development view of a joint main body used in the first embodiment.
Figure 5:
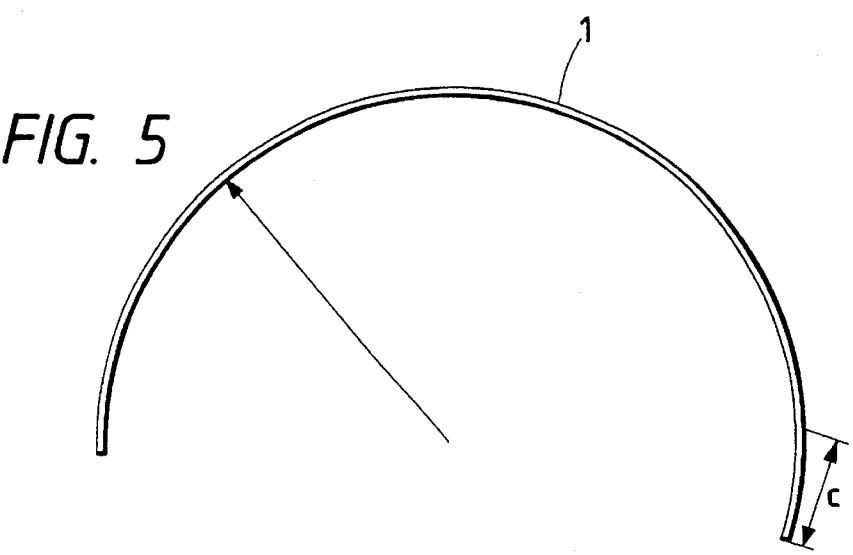
FIG. 5 is a side view of the joint main body used in the first embodiment.
Figure 6:
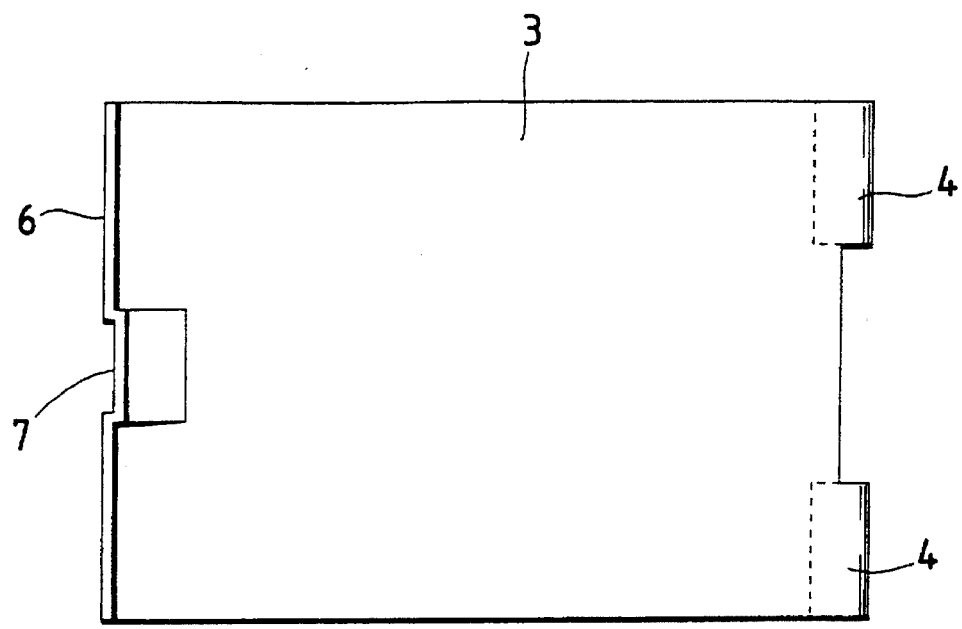
FIG. 6 is a plan view of a flange body used in the first embodiment.
Figure 7:
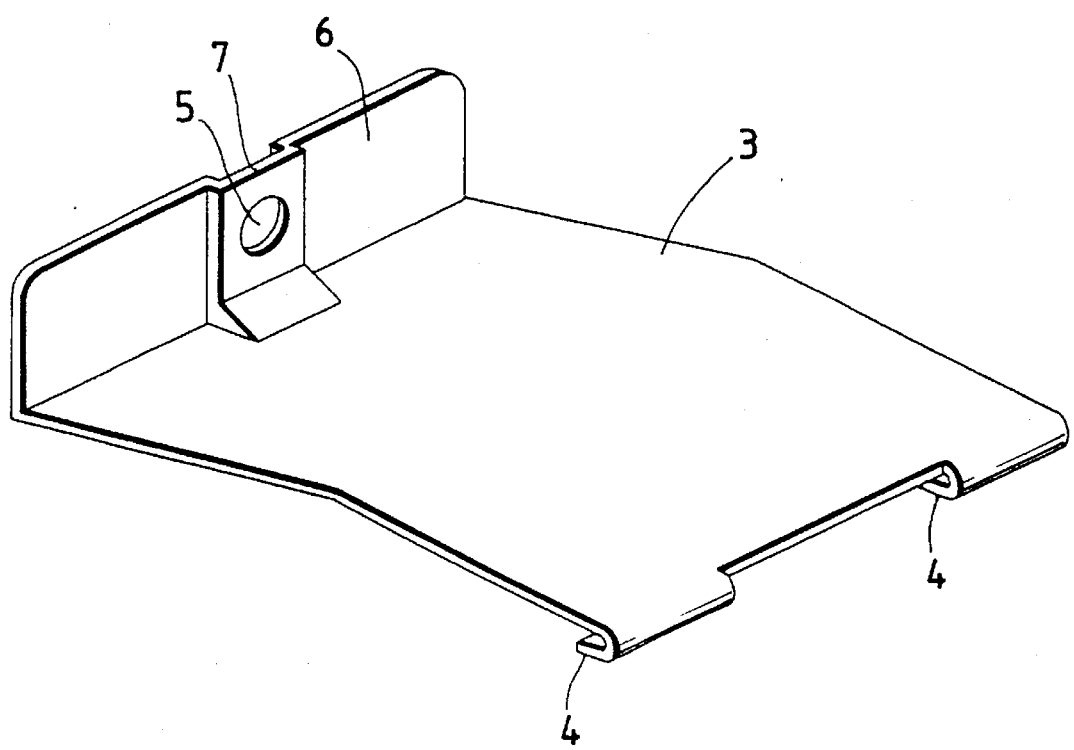
FIG. 7 is a perspective view of the flange body of FIG. 6.

In FIGS. 1 to 7, there is shown a first embodiment of a pipe joint according to the present invention. The first embodiment relates to a pipe joint of a two-division type. In particular, FIGS. 1 to 3 show the state of use of the first embodiment, FIGS. 4 and 5 show a joint main body 1 used in the first embodiment, and FIGS. 6 and 7 show a flange body 3 used in the first embodiment. The joint main body 1 is formed of a zinc plating steel sheet having a thickness of 0.5 to 1.5 mm in a rectangular shape as a whole, as shown in FIG. 4 which is a development view of the joint main body 1. Adjacently to one end side (in FIG. 4, the left end side) of the joint main body 1, that is, at a position spaced apart from the left end edge 1a thereof by a given distance, two sets of securing through holes 2a, each set consisting of two securing through holes 2a, that is, a total of four securing holes 2a are formed in parallel in the width direction (in FIG. 4, in the vertical direction) of the joint main body 1 in such a manner that each securing hole 2a has a U-like shape, when viewed in a plane, and has a bottom portion thereof which is disposed toward the left end edge 1a side. Similarly, adjacently to the other end side (in FIG. 4, the right end side) of the joint main body 1, there are formed in parallel two sets of securing through holes 2b, each set consisting of two holes 2b, that is, a total of four securing through holes 2b are formed in parallel in the width direction in such a manner that each securing hole 2b has a U-like shape, when viewed in a plane, and wherein a bottom portion thereof is disposed toward the right end edge 1b side.

When the joint main body 1 is made of a plate which is easy to bend, the joint main body 1 may be formed in such a flat shape as shown in FIG. 4. However, according to the first embodiment of the invention, as shown in FIG. 5, the joint main body 1 is formed in a semi-circular shape as a whole. A distance b between the right securing hole 2b and the right end edge 1b is set larger than a distance a between the left securing hole 2a and the left end edge 1a, so that the distance b can provide an overlapping width in use. For example, the distance a between the left securing hole 2a and the left end edge 1a is set as 150 mm, while the distance b between the right securing hole 2b and the right end edge 1b is set as 300 mm, and a portion c in the right side distance b covering the range of 150 mm from the right end edge 1b is used as an overlapping width in use. The length and width of the joint main body 1 can be set suitably according to the pipe diameters of the pipes H to be connected and the required connecting width thereof.

The flange body 3 is formed of a zinc plating steel sheet having a thickness of 2 to 3 mm and, as shown in FIG. 6, it is formed in a rectangular shape as a whole. One end side (in FIG. 6, the left end side) of the flange body 3, as shown in FIG. 7, is bent at a right angle to thereby form a flange portion 6. Simultaneously with this, a rib portion 7 is formed in the central portion of the flange portion 6 in the width direction (in FIG. 6, in the vertical direction) thereof in such a manner that the rib portion 7 is recessed inwardly, while a connecting hole 5 for bolt insertion is formed in the central portion of the rib portion 7. On the other end side (in FIG. 6, on the right end side) of the flange body 3, the two end portions thereof, except for the middle portion thereof in the width direction, are extended, and the extended portions thereof are respectively bent toward the back surface side in a U shape when viewed in a side view, thereby forming one set of hook portions 4, 4, the set consisting of two hook portions 4, 4, which are engageable with one set of securing through holes 2 (2a or 2b) formed in the joint main body 1.

The flange body 3 may be formed in a flat plate when it is easy to be bent. However, according to the first embodiment, as can be seen from the side surface shape thereof shown in FIG. 7, as a whole, the flange body 3 is slightly bent substantially at the central portion thereof in the longitudinal direction. The length of the flange body 3 in the longitudinal direction (in FIG. 7, in the right and left direction) is set substantially equal to the distance a between the left securing hole 2a and left end edge 1a of the joint main body 1. The flange body 3 can be formed by welding the flange portion 6. However, if the flange body 3 is formed of a thicker blank than the joint main body 1 so that, as depicted in the present embodiment, the flange portion 6 is formed by bending, then the flange body 3 can be produced very easily.

Figure 8:
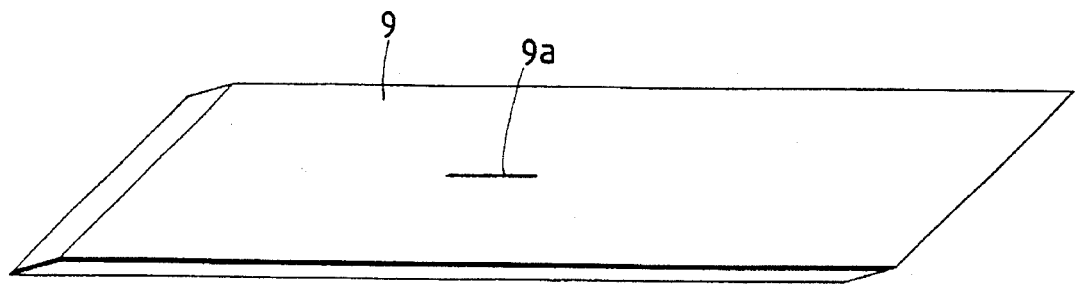
FIG. 8 is a perspective view of a sheet packing.
Figure 9:
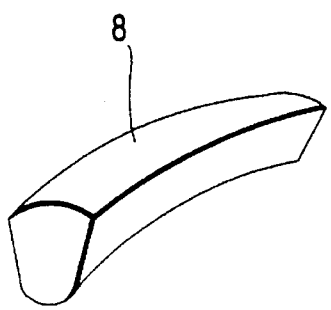
FIG. 9 is a perspective view of a water stopping piece.

Next, description will be given of a procedure in which the pipe joint having the above-mentioned structure is used to connect two spirally corrugated pipes H, which are difficult to prevent water leakage. At first, the joint main body 1 is placed below the connecting areas of the pipes, a sheet packing 9 for sealing shown in FIG. 8 is superimposed on the joint main body 1, the respective end portions of the pipes H, H to be connected are butted against each other along the center line 9a of the sheet packing, and water stopping pieces 8, 8 shown in FIG. 9 and formed of elastic material such as rubber or the like are respectively pushed into grooves formed in the two pipes H, H in the butting areas. After that, the sheet packing 9 for sealing is wound around the entire peripheries of the two pipes H, H, the other joint main body 1 is put on the sheet packing 9, the hook portions 4, 4 of the flange bodies 3, 3 are respectively inserted into and secured to the respective sets of securing holes 2, 2 formed in the neighborhood of the two sides of the upper and lower joint main bodies 1, 1 so that the flange portions 6, 6 of the paired flange bodies 3, 3 are opposed to each other, and, as shown in FIGS. 1 to 3, the bolt 10 is inserted through the connecting holes 5, 5 of the flange portions 6, 6 and is tightened with the nut 11, thereby fixing the flange portions 6, 6 to each other. In this manner, by means of tightening of the bolt 10 and nut 11, the respective end portions of the pipes H, H to be connected are compressed firmly, the respective outer peripheral surfaces of the two pipes H, H are covered with the sheet packing 9, and the groove portions of the two pipes H, H are covered with the water stopping pieces 8, 8 for water stopping, whereby the connection and sealing between the two pipes H, H can be achieved simultaneously.

Figure 10:
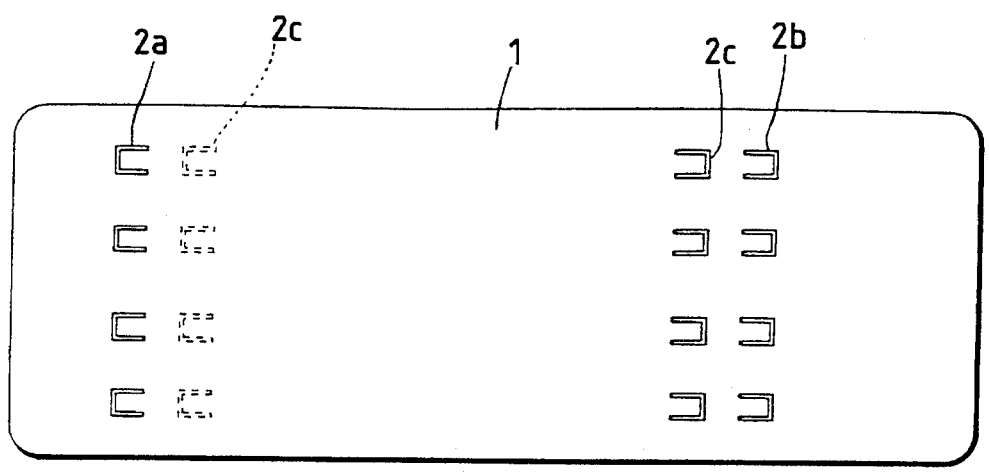
FIG. 10 is a development view of a joint main body used in a second embodiment according to the invention.

Next, other embodiments of a pipe joint according to the present invention will be described. In a second embodiment shown in FIG. 10, a plurality of securing holes 2a, 2b, 2c . . . are formed at proper distances in the longitudinal direction on one end side (or both end sides) of the joint main body 1. Such arrangement permits one joint main body 1 to be used for two or more kinds of pipes to be connected having different pipe diameters.

Figure 11:
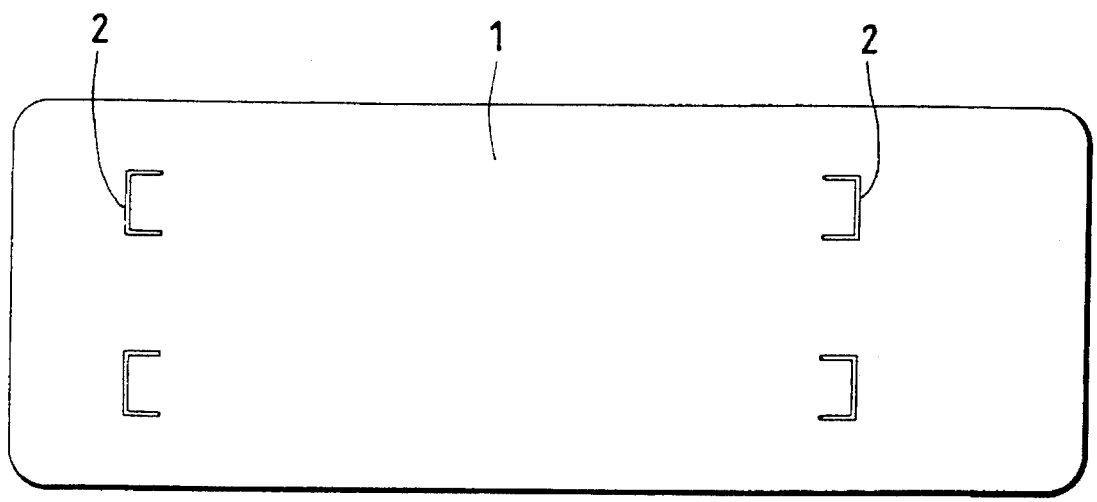
FIG. 11 is a development view of a joint main body used in a third embodiment according to the invention.

In the above-mentioned embodiments, two securing holes 2 are formed into a set and two hook portions 4, 4 are formed in the flange body 3 as well. However, alternatively, a set may consist of one securing hole and only one hook portion may be formed in the flange body 3. In a third embodiment shown in FIG. 11, two securing holes 2 are formed on both sides of the joint main body 1, respectively. When using this joint main body 1, there may be used a flange body 3 which includes only one hook portion 4 or a flange body 3 including two hook portions 4, 4. However, when using the flange body 3 including two hook portions 4, 4, it is preferable to use a flange body 3 having a structure that two connecting holes 5, 5 are formed in the flange portion 6 of the flange body 3 to thereby allow the flange body 3 to be tightened at the two positions thereof.

Figure 12:
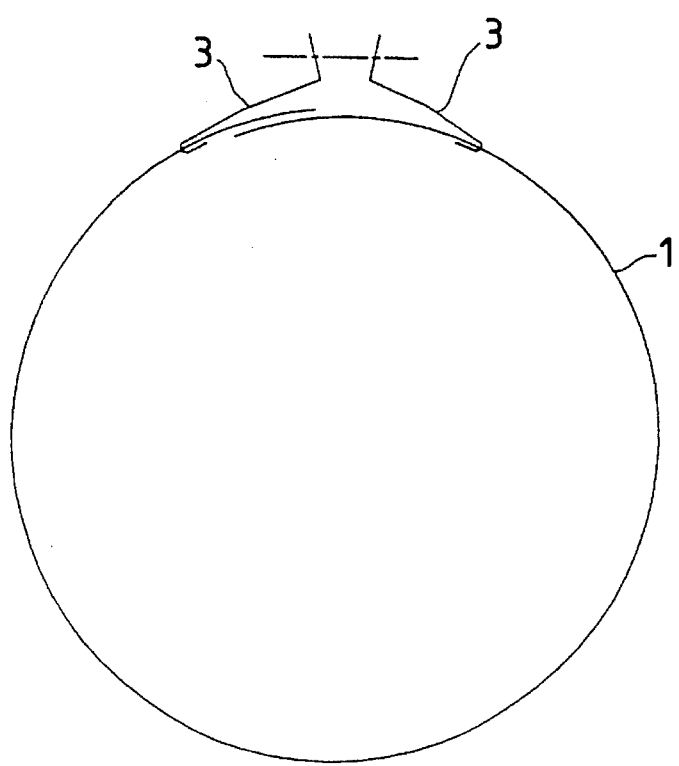
FIG. 12 is a schematic view of a pipe joint according to a fourth embodiment of the invention, showing the side surface shape thereof when in use.
Figure 13:
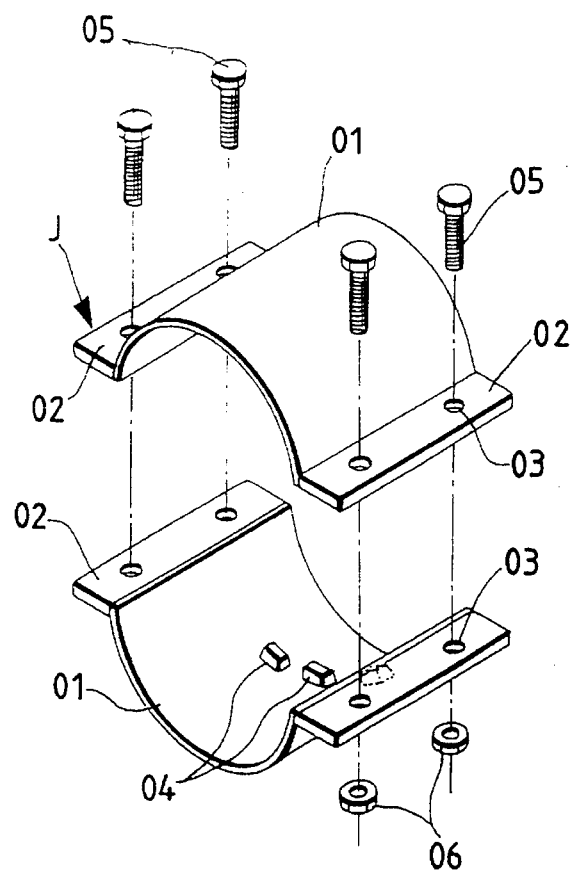
FIG. 13 is an exploded perspective view of the structure of a conventional pipe joint.
Figure 14:
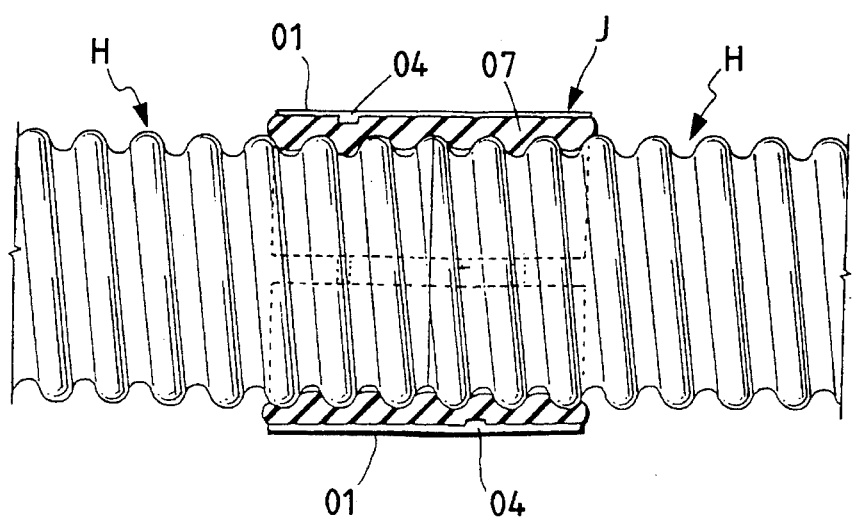
FIG. 14 is a longitudinal section view of the conventional pipe joint, showing the condition thereof when in use.

According to a fourth embodiment of the present invention, as shown in FIG. 12, the joint main body 1 is arranged such that the length thereof is substantially equal to the outer periphery of the pipe H to be connected so that, the joint main body 1 can tighten and connect the two pipes together at one position of the pipe periphery.

Referring to the shape of the securing hole 2 to be formed in the joint main body 1 according to the present invention, if it is formed so as to have a U shape when viewed in the plan view thereof, then the hook portion 4 can be secured to the securing hole 2 using the tongue-shaped portion of the U shape as a guide. That is, the securing hole 2 having such shape is advantageous in that it facilitates the securing of the hook portion 4 to the securing hole 2. Also, if the width (in FIG. 4, the width in the right and left direction) of the bottom portion of the U-shaped securing hole 2, that is, the width of the hole portion thereof for securing the hook portion 4 is set slightly greater than the thickness of the hook portion 4, then the leading end of the tongue-shaped portion, when it is restored, gets in contact with the hook portion 4 to prevent the hook portion 4 from moving in the removing direction thereof when the hook portion 4 is secured to the securing hole 2, thereby being able to prevent removal of the flange body 3 in operation. However, the shape of the securing hole 2 is not limited to the U shape, but other shapes can also be employed, for example, a linear shape (or, a numerical number "1" shape) can be used. Also, when the flange body 3 is formed of a round-bar-like blank, then the securing hole 2 may be formed in an arbitrary shape which can be matched to the shape of the hook portion 4, for example, a round hole or an elliptic hole can be used. Further, the flange body 3 may also be arranged such that the connecting hole 5 formed in the flange portion 6 is not limited to one but two or more connecting holes 5 can be formed.

Although the typical embodiments of the invention has been described, the present invention is not limited to them but other various embodiments can also be enforced, provided that they include the constituent elements of the invention, can achieve the object of the invention, and have the effects to be described below.

As has been already described clearly, the pipe joint according to the present invention consists mainly of two kinds of members; that is, one of them is a joint main body in which securing through holes for securing hook portions are respectively formed at positions respectively spaced apart from the two ends of the joint main body by a given distance in the longitudinal direction thereof; and, the other is two or more flange bodies in each of which hook portions to be inserted into and secured to the securing through holes are formed on one end side thereof and a flange portion having a connecting hole is formed on the other end side thereof. In operation, the hook portions of the flange bodies are secured to the securing holes of the joint main body when the pipe joint is used. In other words, the present pipe joint has such a structure that makes it possible to produce the joint main body having a length corresponding to the pipe diameter of the pipes to be connected and the flange bodies for tightening the joint main body, separately from each other. In operation, the joint main body and flange bodies are secured to each other in a one-touch manner so that they can be used as an integral body. According to the structure of the present pipe joint, the joint main body can be produced very easily, while the flange body need not be produced for every kind of the pipe diameters of the pipes to be connected but can be mass produced as common parts. Therefore, the present invention provides an excellent effect that the pipe joint, as a whole, can be supplied at low costs to the market.

In other words, according to the pipe joint of the present invention, due to the fact that the joint main body forming a main part of the pipe joint and a flange body for tightening the joint main body can be manufactured separately from each other, flange bodies of the same size can be mass produced regardless of the diameters of the pipes to be connected, and the flange bodies of the same size can be used in common for joint main bodies respectively having different sizes. Also, since the joint main body is of a simple structure that only the securing holes are formed in the neighborhood of the two end portions thereof, an operation to form the main body portion thereof by stamping or by cutting and an operation to form the securing holes by stamping can be performed simultaneously, and thus the joint main body can be manufactured easily. Further, because the joint main body does not require direct welding or the like, it is possible to use a thin plate having a thickness that prevents the securing holes from tearing, which makes it easier to produce the joint main body.

Further, the pipe joint according to the present invention is structured such that the hook portions of the flange bodies are respectively secured into the securing holes formed at positions spaced apart from the two end portions of the joint main body by a given distance to tighten the joint main body. Therefore, when compared with a conventional pipe joint in which a flange portion is formed in the end edge portion of a joint main body thereof, the present pipe joint provides an effect that the tightening force of the joint main body can be applied easily and uniformly to the whole peripheries of the pipes to be connected. Also, since the angle of the flange portion of the flange body can be changed in use, it is easy to insert a bolt into both bolt holes respectively formed in the flange portions of the flange bodies.

What is claimed is:

1. A pipe joint, for fluid tightly joining together two pipes having respective end portions butted against each other, said pipe joint comprising:

a joint main body including securing through holes for securing hook portions, each of said securing through holes being formed at positions apart from ends of said joint main body, said joint main body being disposed across the butted end portions of the two pipes; and a plurality of flange bodies each including a hook portion formed on one end side thereof to be inserted from an outer surface side of said joint main body into and secured to said respective securing through holes, and a flange portion formed on the other end side thereof, said flange portion being provided with a connecting hole, wherein two pairs of said flange bodies are disposed separately from each other, with said butted end portions of the two pipes disposed between said two pairs of said flange bodies, one of said two pairs of said flange bodies is disposed on an outer surface of one of the two pipes, and the other of said two pairs is disposed on an outer surface of the other of the two pipes; and wherein said flange bodies are placed on the outer surface side of said joint main body to press said joint main body, at least one end of said joint main body protrudes toward a side of the other end of said joint main body at an inner surface of a corresponding said flange body across a corresponding said flange portion of the corresponding said flange body so that said joint main body is disposed in one of a butted state and a doubly state.

2. A pipe joint as claimed in claim 1, wherein said securing through holes are formed into a U shape, a bottom of said U shape opposing to nearer one of said ends of said joint main body.

3. A pipe joint as claimed in claim 1, wherein said securing through holes are arranged in a line in a width direction of said joint main body.

4. A pipe joint as claimed in claim 1, wherein said securing through holes are arranged in two or more lines in a width direction of said joint main body.

5. A pipe joint as claimed in claim 1, wherein said joint main body includes a pair of joint main bodies, and an end of one of said pair of joint main bodies protrudes from one of said pair of flange bodies to a location inside of the other of said pair of flange bodies, so that said end of the one of said pair of joint main bodies overlaps over the other of said pair of joint main bodies.

* * * * *